Feb. 20, 1923.

F. A. ODDIE

1,446,205

AUTOMATIC CONTROL OF VARIABLE SPEED GEARS FOR SELF PROPELLED VEHICLES

Filed Jan. 4, 1921      3 sheets-sheet 1

Inventor:
F. A. Oddie,
By Watson, Coit, Morse & Grindle,
Attorneys.

Patented Feb. 20, 1923.

1,446,205

UNITED STATES PATENT OFFICE.

FRED ALBERT ODDIE, OF LONDON, ENGLAND, ASSIGNOR TO ODDIE AUTOMATIC VARIABLE SPEED GEAR SYNDICATE LIMITED, OF LONDON, ENGLAND.

AUTOMATIC CONTROL OF VARIABLE-SPEED GEARS FOR SELF-PROPELLED VEHICLES.

Application filed January 4, 1921. Serial No. 434,986.

*To all whom it may concern:*

Be it known that I, FRED ALBERT ODDIE, a subject of the King of England, and residing at London, in England, have invented certain new and useful Improvements in the Automatic Control of Variable-Speed Gears for Self-Propelled Vehicles, of which the following is a specification.

This invention relates to the automatic control of variable speed gears for self-propelled vehicles and has for its object to effect certain improvements in apparatus of the type described in the specification of the present inventor's United States of America Patent No. 1,185,528 dated 30th May 1916.

While the invention may be used for the control of different types of variable speed gear it is more particularly intended for use with speed gear constructed as described in the specification of the above mentioned patent. Such gearing comprises a series of toothed wheels which are constantly in mesh those wheels corresponding to the required speed being connected at the required moment by clutches of some suitable type to the shaft on which they are mounted. A tapered plunger moves longitudinally within the shaft which carries the gear wheels and this plunger serves to actuate radially movable friction or other clutch members by means of which the wheels can be successively locked to the shaft. The gear ratio can thus be changed by movement in either direction of a member connected to this plunger.

According to this invention the control mechanism has a member to which a rocking or reciprocating movement is imparted and a governor which is driven off the power transmitting shaft actuates means by which this member can be caused to engage with or be disengaged from a selector member by movement of which the gear ratio is changed. Thus movement in one direction or the other will be imparted to the selector member when the other member is engaged therewith and is reciprocated or rocked. By imparting a constantly reciprocating movement to the member the governor will be operative to cause this member to engage with or be disengaged from the selector member while the driving shaft is rotating. The engagement between the member which is reciprocated or rocked and the selector member may be direct or through one or more intermediate members arranged so as to effect the necessary selection in the gear. In a gear of the type to which the invention is more particularly applicable the movement of the selector gear changing member in one direction increases the gear ratio while movement of this member in the opposite direction decreases the ratio. Oppositely toothed racks are mounted or formed on this selector and the member which is reciprocated or rocked carries pawls adapted to engage either of these racks in such a way that when thus engaged the movement of the pawl carrying member as it is reciprocated will impart movement in one direction or the other to the selector. In the preferred arrangement the governor is connected to the reciprocating member so that movement will be transmitted to this member from the governor in such a manner as to cause one or other of the pawls to be engaged with or disengaged from one or other of the racks on the gear-changing member. The arrangement is such that when the speed of the power transmission shaft exceeds a predetermined but variable limit the governor will move the reciprocating member and cause one of the pawls carried thereby to engage with one of the racks on the gear-changing member with the result that the gear ratio will be varied. The speed changes will thus be automatically effected from the lowest gear to the top gear or top drive by the movement derived from the governor as a result of variations in the engine speed. If the engine speed falls below a predetermined but variable limit the governor will act on the reciprocating member so as to cause the other pawl carried thereby to engage the second rack on the selector member with the result that the latter will be moved in the opposite direction and a lower gear will be engaged. The governor will thus cause further alterations in the gear ratio and lower gears to be brought successively into operation until the lowest gear is engaged.

The gear changing mechanism controlled by the governor is combined with means for operating the main clutch through which power is transmitted to the gear box so that this clutch will be automatically disengaged temporarily when the gear ratio is being changed. Means are also provided for controlling the mechanism by hand so that the gear can be set when desired in a neutral position in order to prevent power from being transmitted through the gear. It is preferable to provide means for operating the clutch separately so that it can be disengaged when desired independently of the action of the governor and automatic mechanism.
It is desirable to provide means whereby the action of the governor on the reciprocating member can be modified in accordance with the extent to which the throttle valve is opened so that if the throttle is opened to a considerable extent when the engine speed is falling the operation of the governor on the gear changing member will be advanced with the result that the gear ratio will be increased when the engine speed is higher than would be the case if the throttle was more closed. This will enable full throttle opening to be employed when the engine speed is high but will prevent straining of the engine and will ensure automatic changing of the gear when the load is increased to the point when the gear ratio should be increased. It is desirable however to provide a dash-pot device which is connected to the reciprocating member or some other part of the mechanism so as to prevent any unduly rapid movement of this member by the governor in the event of rapid opening of the throttle when the engine speed is such that this opening of the throttle and consequent modification of the governor action would otherwise cause an almost immediate engagement of the reciprocating member with the gear changing member.

For the purpose of obtaining a reverse drive means are preferably provided whereby the gear changing member can be positively moved by operation of a hand-controlled or other lever but in some cases the engagement of the reverse gear may be brought about by the action of the reciprocating member after manipulation of a suitably arranged hand lever.

The invention may be carried out in practice in various ways but the accompanying drawings illustrate by way of example a construction that may be adopted in applying the invention to an ordinary motor road vehicle provided with a variable speed gear of the type more particularly indicated above, such gear permitting of four changes of speed in the forward direction and a reverse. In these drawings which are to some extent diagrammatic.

Like letters indicate like parts throughout the drawings.

Figure 1:
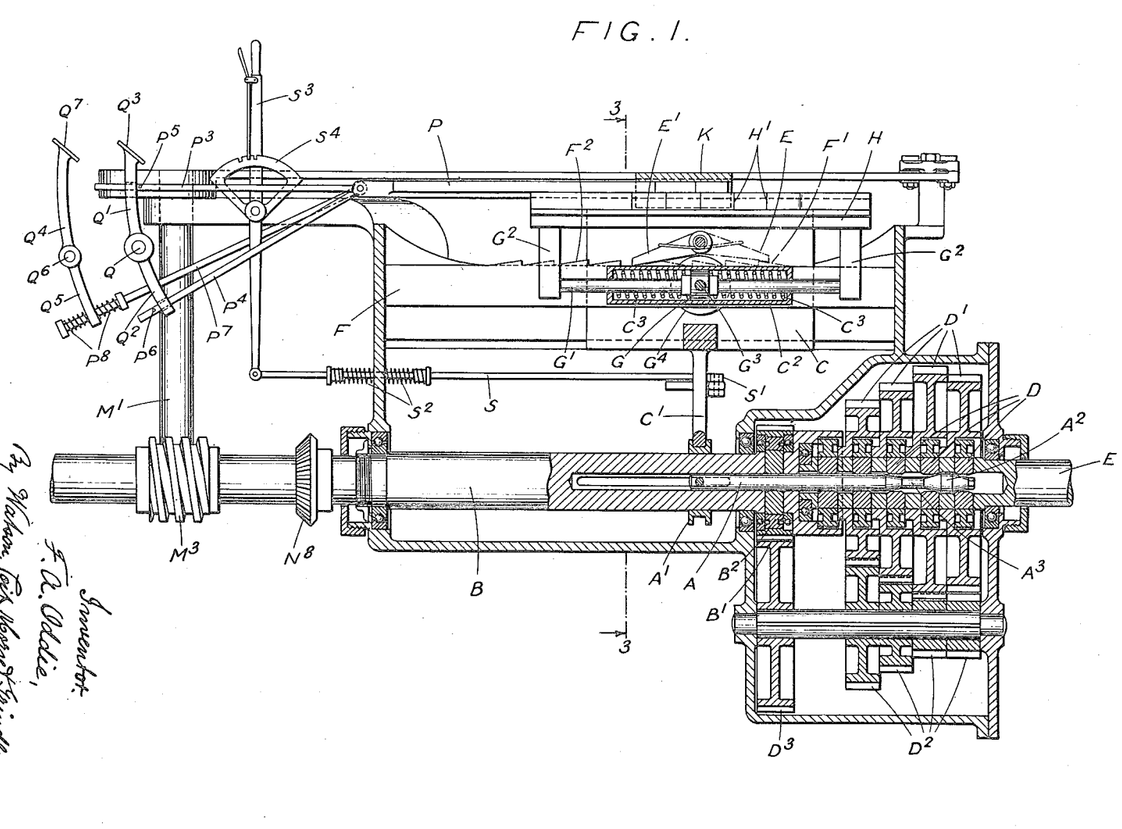
Figure 1 is a vertical sectional elevation of the control mechanism and the variable speed gear.

The gearing may be constructed and arranged as shown in Figure 1 which is as the gearing described and illustrated in the specification of the prior patent above referred to. The gear changes are brought about by the longitudinal movement of a selector rod A which is carried within the power transmission shaft B and actuated by a sliding member C, the connection between this member and the rod A comprising a downwardly directed arm C' having a forked end which engages a collar A' mounted on the shaft B and connected to the rod A. The rod A has on it an enlargement $A^2$ which as this rod is moved in one direction or the other causes members D to be pushed outwards and one or other of a series of clutches to be engaged whereby either toothed wheel D' of the gear can be locked to the driven shaft E. The gear wheels D' are constantly in mesh with gear wheels $D^2$ mounted on a lay shaft which also carries a toothed wheel $D^3$ meshing with a pinion B' carried on the driving shaft B to which this pinion is normally locked by means of a clutch $B^2$ actuated by the main part of the rod A. This rod has a part $A^3$ of reduced diameter which releases the clutch $B^2$ and frees the wheel B' when the top gear or direct drive is engaged. The main part of the rod A has a diameter which as mentioned will maintain the clutch $B^2$ in action so that the wheel B' is normally locked to the shaft B but the diameter of this part of the rod is not sufficient to engage the members D of the other clutches which are operative on the wheels D' and to effect the direct drive, these clutches being only engaged by the enlarged end portion $A^2$ of the rod A.

The sliding member C can be fixed in the several positions corresponding to the various speeds as selected by the rod A by means of oppositely arranged spring-actuated pawls E' mounted on the member C and adapted to engage fixed racks F on which are oppositely arranged teeth F' and $F^2$. The sliding member C has fixed thereon a cylinder $C^2$ containing two coiled springs $C^3$ respectively disposed between the ends of the cylinder and the opposite sides of a piston G movable in the cylinder. This piston is carried about the centre of a rod G' which passes through each end of the cylinder C and is carried by brackets $G^2$ on the under-side of a horizontally arranged sliding member H which may be designated the main gear changing member. A pin $G^3$ extends transversely through the piston G the ends of the pin extending through longitudinal slots in the sides of the cylinder $C^2$ and carrying rollers $G^4$. These rollers $G^4$ are so positioned that they will be operative to trip or lift the pawls E and E' out of engagement with the rack teeth F' F² the racks being disposed on either side of the cylinder C. The device forms a yielding connection between the gear changing member H and the parts C C' such that if a force is applied to the gear changing member H tending to slide it in one direction or the other any movement of this member will be inoperative to effect any change in the gear until the piston G has moved against the action of either of the springs C³ sufficiently far to cause the rollers G⁴ to trip either the pawls E or E' when the member C will be moved sufficiently to bring these pawls into engagement with the next teeth on the fixed racks and a change in the gear will be effected. Thus the member H can be caused to move in one direction or the other within certain predetermined limits without any change in the gear ratio being effected.

The gear changing member H comprises a plate suitably mounted in guides J conveniently on the top of the member C so that it can reciprocate parallel to and preferably over the shaft B. The member H is formed on its upper side with two sets of laterally projecting teeth H' H² each set of teeth being conveniently four in number and corresponding to the several forward speeds. The teeth H' are directed oppositely to the teeth H² and each tooth is preferably slightly undercut. It is desirable that the distance between each two teeth should be considerable in relation to the depth of the teeth the teeth being formed as shown as moderately acute angles.

The reciprocating member, more particularly with respect to that part which carries the pawls adapted to engage the teeth H' H² of the gear changing member H, may be variously constructed and the reciprocation of this member may be brought about in different ways as found desirable. Conveniently the pawl carrying portion of the reciprocating member comprises a box or casing K which is mounted over the gear changing member H so as to enclose the top portion of the latter on which are the lateral teeth H' H² the box K being arranged so that it can reciprocate on flat surfaces H³ formed on the member H adjacent to the teeth. Within the box K and suitably formed in or carried on the opposite sides thereof are projections or teeth K' K² constituting pawls which are adapted to engage respectively the teeth H' H² on the gear changing member H. Conveniently there is one pawl K' in one side of the box K and one pawl tooth K² in the opposite side of the box. These pawl teeth K' K² face each other and each faces one of the sets of teeth H' and H². The arrangement is such and the dimensions of the casing K are so determined that the box can slide longitudinally and freely over the toothed portion of the gear changing member H without the pawl teeth K' K² being in engagement either with the teeth H' or with the teeth H² but if the box K is moved laterally in one direction the pawl tooth K' will engage one of the teeth H' or if the box is moved in the other direction the pawl tooth K² will engage one of the teeth H².

Though the numbers of the teeth H' and H² on the gear changing member H respectively correspond as mentioned to the number of forward speeds in the variable speed gear and though the box K carries only one pawl tooth K' and K² on each side, it is to be understood that in some cases there may be a larger number of pawl teeth formed in the box K in which case the number of teeth H' and H² will be increased. By increasing the number of the pawl teeth in the box K and the number of teeth on the gear changing member H the strength of the connection between the reciprocating member K and the gear changing member H will be increased and any tendency for wear to occur between the pawls K' K² and the teeth H' H² will be distributed over these pawls. The box K is connected to one end of a rod L which at the other end is pivotally coupled to one arm L' of a two-armed lever adapted to rock about a spindle L² which is conveniently arranged vertically. To the second arm L³ of this lever is pivoted one end of a link L⁴ whose other end is coupled to the strap of an eccentric M mounted on a spindle M' which may also be arranged vertically. On this spindle M' is a worm wheel M² which gears with a worm M³ mounted in a suitable position on the transmission shaft B. Thus as the shaft B rotates the two-armed lever L' L³ will be oscillated and the box K will be reciprocated. The mechanism by which the box K is caused to reciprocate is so constructed that the range through which this pawl carrying box moves, that is to say its stroke over the teeth of the gear changing member H, is equal to the distance through which the member H must be moved in order to trip the pawls E and E' and move the sliding member C through the yielding connection between the parts H and C to the extent required to bring about a change in the gear ratio. The speed at which the member K is reciprocated is determined in relation to the engine speed and with regard to ensuring a sufficiently rapid operation of the mechanism and changing of the gear ratio in order to meet ordinary requirements.

The type of governor employed may vary but conveniently it is of that known form which comprises two oppositely disposed balls N forming with two pairs of links N' N² weighted arms which when rotated about a spindle N³ swing out from the spindle to an extent determined by the speed at which the spindle is rotated and in accordance with the strength of a spring N⁴ disposed around the spindle between a collar N⁵ fixed on the spindle and to which the links N' are attached and a collar N⁶ to which the links N² are attached. The collar N⁶ will then move along the spindle N³ in one direction or the other according to the speed at which the spindle is rotated. The governor spindle N³ is driven in some suitable manner off the transmission shaft B so that this spindle will rotate at a speed which bears a definite relation to the engine speed. In the case illustrated the drive is shown somewhat diagrammatically as being effected by a shaft carrying at its ends bevel wheels which gear respectively with a bevel wheel N⁷ on the spindle N³ and a bevel wheel N⁸ on the shaft B. The sliding member or collar N⁶ is connected by levers and links in some convenient manner to the reciprocating box K so that movement of the collar N⁶ will cause lateral movement of the box K in one direction or the other whereby engagement between one or other of the pawl teeth K' or K² and the corresponding toothed rack H' or H² will be brought about. As shown somewhat diagrammatically and by way of example this connection may comprise a two-armed lever pivoted at O one arm O' of this lever being forked to engage an annular groove in the collar N⁶. The other arm O² of the lever engages one end of a rod O³ whose other end is forked at O⁴ to engage a laterally projecting pin K³ carried by the box K. The pin K³ extends substantially parallel to the direction in which the box K is reciprocated and is of such length and the nature of the connection at O⁴ is such as to cause it to be maintained while allowing the necessary freedom of movement to the box K so that it can reciprocate and also be moved laterally.

The strength of the governor spring N⁴ is so determined that at a certain engine speed the box K will be held in an intermediate position so that as the box reciprocates neither the pawl tooth K' or the pawl tooth K² can engage a tooth H' or H² of the gear changing member. If, however, the engine speed decreases the box K will be shifted laterally so as to bring the tooth K' into engagement with the rack H' with the result that the gear ratio will be altered and increased. On the other hand, if the speed of the engine and of the governor increases beyond the predetermined neutral limit the box K will be shifted laterally in the opposite direction so as to bring the pawl tooth K² into engagement with the rack H² with the result that a change in the gear in the opposite sense will be effected and a lower gear ratio will come into operation.

The reciprocating box or member K is caused to effect disengagement of the main clutch between the transmission shaft B and the engine when the change in the gear ratio is being effected and this is brought about in the following way. Above the toothed portion of the gear changing member H and sliding thereon in a longitudinal direction is a member P whose width is substantially equal to that of the top part of the gear changing member H which carries the teeth H' H². On each of the opposite sides of the sliding member P are formed teeth P' P² there being preferably a single tooth on each side though a greater number may be provided if desired. These teeth P' P² are formed and arranged in a manner similar to the teeth H' H² and they have substantially the same dimensions. The member P can slide in a longitudinal direction independently of but parallel to the gear changing member H which on its part can move without imparting movement to the member P and the latter passes through the box or casing K. The lever by which the clutch may be controlled in the ordinary way by the foot is pivotally mounted at Q and provided with two arms Q' Q². The arm Q' carries at its end the usual pedal Q³ by means of which the lever Q' Q² can be turned by foot action. Extending from the adjacent end of the sliding member P to which they are pivotally connected are two rods P³ P⁴ the free end of the rod P³ passing through a hole in the lever arm Q' while the end of the rod P⁴ similarly passes through a hole in the lever arm Q². The rod P³ carries a stop pin P⁵ on that side of the lever Q' which is adjacent to the sliding member P while the rod P⁴ has a stop pin P⁶ on the side of the lever Q² which is remote from the sliding member P. The arrangement is such that if the member P is caused to slide to the left, as shown in Figure 1, it will exert a thrust through the rod P³ on the clutch lever arm Q' and the clutch will be disengaged. Disengagement of the clutch will also be effected if the member P is caused to slide to the right when a pull will be exerted on the clutch lever arm Q² through the rod P⁴. Hence disengagement of the clutch will be brought about through the member P in whichever direction it may be moved.

Movement is imparted to the clutch actuating member P either by the tooth K' or the tooth K² in the casing K these teeth having such dimensions, that is to say being of such breadth, as will enable them to engage respectively the teeth P' and P² of the clutch actuating member as well as the teeth H' and H² of the gear changing member.

The arrangement is such that whenever a pawl tooth $K'$ or $K^2$ enters into engagement with a tooth $H'$ or $H^2$ this pawl tooth will at the same time engage either the tooth $P'$ or the tooth $P^2$ of the clutch actuating member P. The positions of the stops $P^5$ and $P^6$ on the rods $P^3$ and $P^4$ are conveniently such that a certain limited movement can be imparted to the member P in either direction without this movement being communicated to the clutch lever $Q'$ $Q^2$. Thus the clutch will not be disengaged unless the box K has been positioned laterally and is maintained there so as to engage the gear changing member H and cause it to be shifted sufficiently to effect a change in the gear ratio. The sliding member P is normally maintained in a substantially mid position by the spring which usually controls the main clutch and the clutch operating lever $Q'$ $Q^2$, this position being such that the teeth $P'$ $P^2$ lie normally in the longitudinal direction somewhere mid-way between the positions normally occupied by the teeth $H'$ $H^2$.

It is desirable to provide some means whereby the gear can be positively retained in the neutral state and the pawl teeth $K'$ $K^2$ prevented from engaging the teeth $H'$ $H^2$ of the gear changing member H irrespective of the engine speed and for this purpose the following device may be employed. A plate R which can slide in the vertical direction in guides $R'$ is arranged above and transverse to the longitudinally extending pin $K^3$ which serves as part of the connection between the reciprocating box K and the governor. In this plate R is a slot having an inclined inner end part $R^2$, a straight vertical intermediate part $R^3$ and a V-shaped opening $R^4$ at the end of the slot. The slot is of a width adapted to engage the pin $K^3$ and the plate is controlled by a suitably arranged hand control lever. When the plate is in the raised position the reciprocating member K is free to be shifted laterally by the action of the governor but if the plate R is lowered so that the pin $K^3$ enters the vertical part $R^3$ of the slot into which the pin will be guided by the V-shaped opening $R^4$, the plate will hold the member K so that it cannot be moved laterally the pawl teeth $K'$ $K^2$ then being positioned so that they are out of engagement with the teeth $H'$ $H^2$. The governor is then unable to effect the engagement of the pawls with the teeth.

Figure 2:
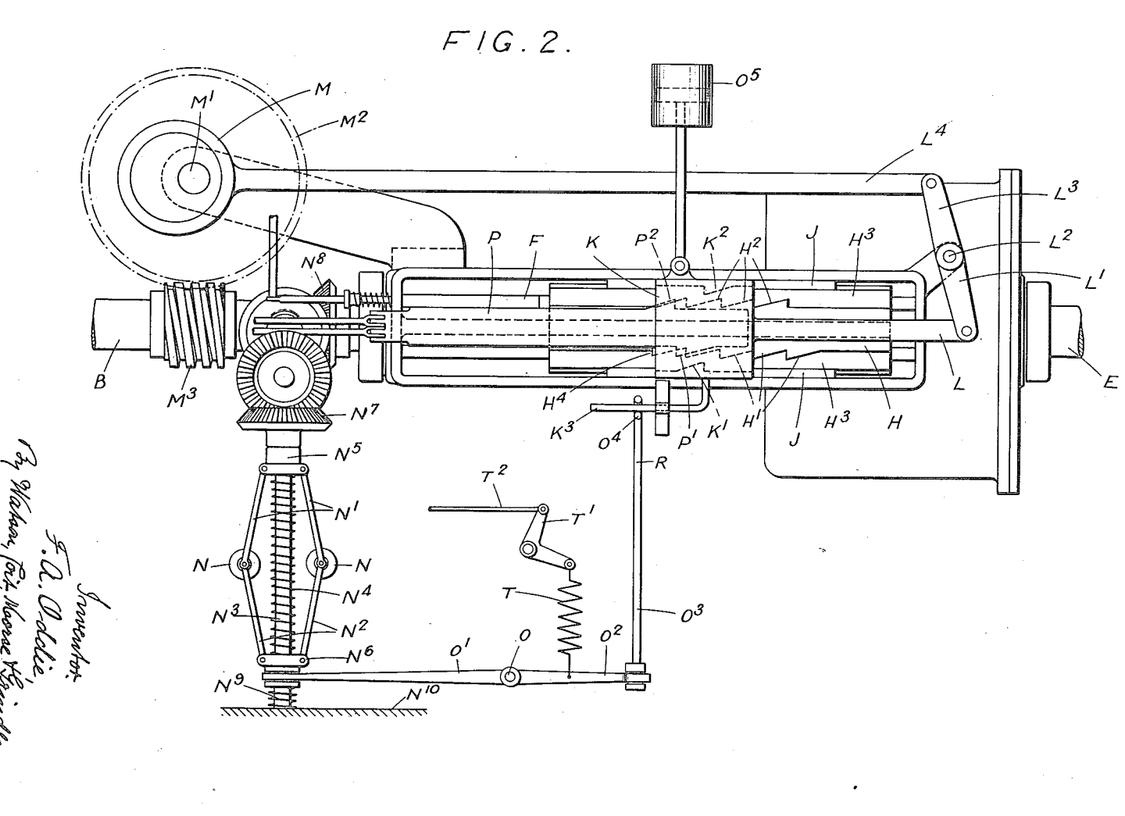
Figure 2 is a plan of the same.
Figure 3:
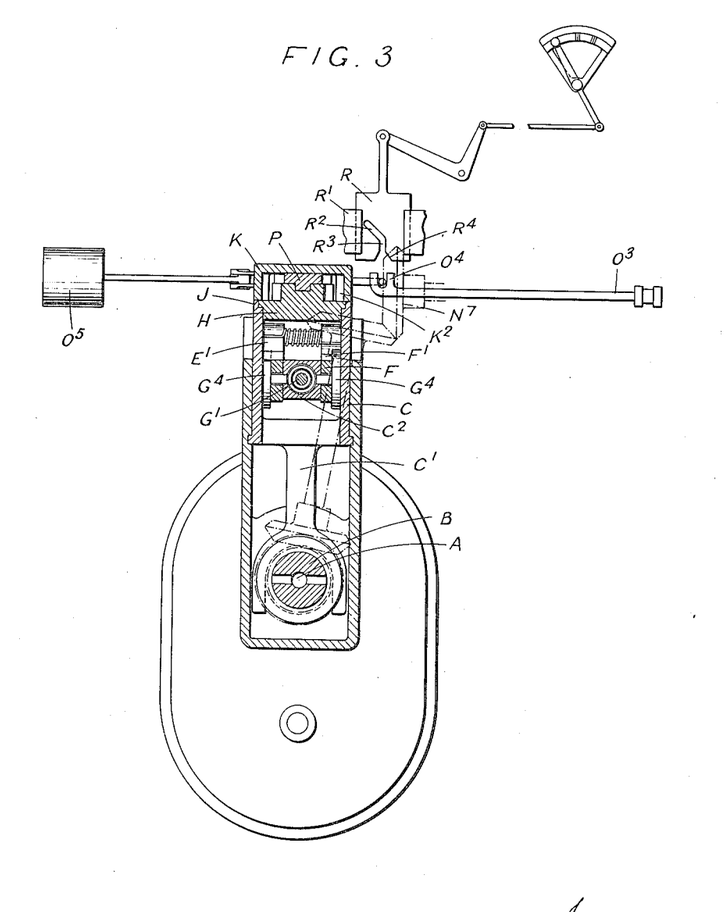
Figure 3 is a vertical transverse section on the line 3—3 in Figure 1 looking in the direction of the arrows.

The inclined part $R^2$ of the slot in the plate R is employed when it is desired to engage the reverse gear. It will be seen that if the plate R is lowered sufficiently to cause the pin $K^3$ to enter the inclined part $R^2$ of the slot the pawl carrying box K will be moved to one side thereby causing the pawl tooth $K'$ to enter into engagement with an extra tooth $H^4$ on one side of the gear changing member H. The mechanism will have automatically changed the gear down so that the gear changing member H is in its extreme position towards the right as seen in Figures 1 and 2 before the reverse gear is to be used and the extra tooth $H^4$ is then in a position to be engaged by a pawl tooth $K'$. This extra tooth $H^4$ is not positioned in the same line with the other teeth $H'$ but is set inwardly or back therefrom so that for the pawl $K'$ to enter into engagement with the tooth $H^4$ the member K must be moved laterally further than it would normally be moved by the action of the governor in order to effect engagement with either of the teeth $H'$. When the member K has thus been shifted laterally by means of the plate R, the main clutch at this time having been thrown out by foot operation of the lever $Q'$ $Q^2$, the clutch can now be re-engaged when it will be found that the reciprocating movement of the member K acting through the gear changing member H will have caused the reverse gear to be engaged. If now the plate R is raised so as to return the member K to its neutral position or if this plate is raised still further so as to free the member K altogether, the gear changing member H will be automatically returned to its neutral position and the reverse gear disengaged by the action of a spring suitably disposed and operating on the gear changing mechanism. The spring means for returning the gear to the neutral state after the reverse has been engaged may comprise a rod S which passes through some fixed part of the framing this rod having an end $S'$ which is curved or shaped to lie behind the arm $C'$ which extends from the sliding member C and forms the connection to the selector rod A. Springs $S^2$ act on this rod so as to tend to maintain it in a mid position where the end $S'$ will prevent the arm $C'$ from moving unless it is forced to do so in the direction which will cause the reverse gear to be engaged. The reverse drive is brought about by locking the endmost wheel $D'$ to the shaft E. The rod S may be free except for the control exerted on it by the springs $S^2$, or, as is preferable, the end which is opposite to that which engages the arm $C'$ may be pivotally connected to a hand lever $S^3$ which is movable over a quadrant $S^4$ the lever $S^3$ having a finger detent to enable it to be locked. By means of this hand lever when the reverse is to be engaged the end $S'$ of the rod S can be moved into a position such as to leave the sliding member C free to be shifted by the gear changing member H so as to engage the reverse gear the lever $S^3$ being moved again when the reverse is to be disengaged. This lever $S^3$ may be arranged if desired to also effect the lowering of the plate R into its extreme position so that the inclined part $R^2$ of the slot in the plate will engage the pin $K^3$. With this hand lever arrangement the reverse gear can thus be disengaged by hand and the mechanism moved into the neutral state.

It is convenient to provide a device $O^5$ of the nature of a dash pot to control the lateral movements of the reciprocating member K. This dash pot is of some suitable type comprising for example, as shown in Figure 2, a piston moving in a cylinder containing oil or air the piston being connected by a link to the member K. By means of this dash pot sudden lateral movement of the reciprocating member K consequent on fluctuations in the governor speed and sudden movements of the collar N are prevented.

The mechanism operates in the following way. In the first place it must be noted that when the engine is running dead slow as when the throttle is closed the speed at which the governor is then rotated will have decreased so as to cause the gear to be thrown in to the neutral state and thus when the engine is stopped the gear will remain in neutral. Hence when the engine is again started in the ordinary manner the gear will be in neutral and the speed at which the governor will be rotated will maintain the mechanism in that state until the throttle is open so as to increase the speed of the engine and the governor. The action of the slotted plate R will also serve to keep the gear in neutral though this plate will naturally be raised before starting the vehicle.

The pawl tooth $K^2$ and the rack teeth $H^2$ are operative to change the gear from a lower to a higher ratio while the pawl tooth $K'$ and the rack teeth $H'$ on the gear changing member H are operative to change the gear from a higher to a lower ratio. As the engine speed increases following the opening of the throttle the governor acting through the sliding collar $N^6$ and lever $O'$ $O^2$ will move the member K from its mid or neutral position so that the pawl tooth $K^2$ will be brought into engagement with the first tooth $H^2$. Since the member K is constantly being reciprocated through the lever $L'$ $L^3$ by the eccentric M driven off the driving shaft B when the engaging teeth are interlocked a movement towards the left, as the parts are shown in Figure 2, will be imparted to the gear changing member H. The pawl tooth $K^2$ will simultaneously have engaged the tooth $P^2$ of the clutch actuating member P so that as movement is imparted to the gear changing member H so will the clutch lever $Q'$ be acted on through the sliding member P and the clutch will be disengaged. This sliding movement of the member H will be imparted through the yielding connection to the member C and through the arm $C'$ to the selector rod A. The rollers $G^4$ will first trip the pawls $E'$ from the racks $F^2$ thus permitting movement of the member C through the yielding connection. In this way the gear giving the first speed will be engaged and as soon as the member C has taken up its new position in which it will be locked by the pawls E and $E'$, on the return stroke to the right of the box K the gear changing member H will be left behind taking up a new position corresponding to that of the member C. The sliding member P, however, will follow the box K in its movement to the right owing to the action of the spring on the clutch lever $Q'$ and the clutch will be re-engaged. The speed of the engine and of the governor will then slow down and consequently the collar $N^6$ will be moved so as to shift the box K into its mid position with the pawl $K^2$ out of engagement with the teeth $H^2$. If now the engine speeds up a similar process will be gone through and the second speed will be engaged and so on until the top gear is in operation. If now the engine speed slows down the collar $N^6$ will move sufficiently to shift the box K laterally in the opposite direction thereby bringing the pawl tooth $K'$ into engagement with one of the teeth $H'$ with the result that the mechanism will be actuated so as to engage a lower gear. The engine will then speed up again and the governor will cause the box K to assume once more a mid or neutral position.

It is convenient to provide a spring $N^9$ around the end of the governor spindle $N^3$ beyond the collar $N^6$ and between this and some fixed part $N^{10}$ this spring being arranged so as to act on the collar $N^6$ if it moves beyond the normal position which it occupies after the lowest gear has been engaged and the mechanism is in the neutral state. This spring enables the lever $O'$ $O^2$ and the collar $N^6$ to be moved with the box K when the reverse gear is to be engaged while causing the automatic return of the governor collar $N^6$ to its normal zero position when the engine is at rest. The spring $N^9$ also operates to bring the box K into its normal mid position after the reverse gear has been engaged.

It is desirable on the one hand to provide means for modifying the action of the governor when the throttle is actuated and on the other hand to provide means for actuating the throttle lever when a change is being automatically effected in the gear. In the first case between the lever controlling the engine throttle valve and some part coupled to or acting on the sliding collar $N^6$ of the governor is a connection which includes a spring so arranged that as the throttle is opened this spring will cooperate with the governor spring $N^4$ and in effect the strength of this spring will thereby be increased. When this extra spring is in operation the governor weights will swing out less far at a predetermined speed and consequently the movement of the collar $N^6$ will be modified with the result that the member K will be shifted laterally so as to cause the pawl $K^2$ to engage the teeth $H^2$ and bring about a decrease in the gear ratio, at an engine speed greater than would be the case if the throttle were open to a less extent. A convenient arrangement is to dispose a spring T between the lever arm $O^2$ and a lever T' which is connected by a link $T^2$ to the throttle lever in such a way that as the throttle is opened the tension of the spring T will be increased thereby exerting a pull on the lever arm $O^2$ which will co-operate with the thrust exerted on the lever arm O' by the governor spring $N^4$ through the sliding collar $N^6$. If the engine is running with the throttle half open and at a speed which is slightly in excess of that which would normally cause the governor to move the collar $N^6$ in a direction tending to bring about engagement between the pawl $K^2$ and the teeth $H^2$, and if the throttle is now opened wider the result will be that the pawl $K^2$ will be caused to actually engage one of the teeth $H^2$ so that a decrease in the gear ratio will be brought about.

One method of connecting the throttle lever to the gear changing mechanism is shown by way of example in Figure 1. The means by which the throttle is controlled may conveniently comprise a two-armed lever $Q^4$ $Q^5$ pivoted at $Q^6$ and provided with a pedal $Q^7$ to enable it to be actuated by the foot. From the adjacent end of the sliding member P and pivotally connected thereto extends a rod $P^7$ whose free end passes through a hole in the lever arm $Q^5$. On the rod $P^7$ and disposed on either side of the lever $Q^5$ between the opposite faces of this lever and collars fixed on the rod $P^7$ are two coiled springs $P^8$. Thus if the member P is caused to slide in either direction it will tend to turn the throttle lever $Q^4$ $Q^5$ in one direction or the other, the springs $P^8$ constituting such a yielding connection, however, that the throttle lever can be independently actuated when desired. With this arrangement as the engine speeds up and a change is brought about to a lower gear ratio the member P as it is caused to slide to the left will tend to move the lever $Q^4$ $Q^5$ in the direction necessary to close the throttle. On the other hand, when a change down in the gear is taking place and the member P is moved to the right, it will tend to turn the lever $Q^4$ $Q^5$ in the direction necessary to open the throttle.

The details of construction may be modified to meet requirements and the particular type of variable speed gear and motor road vehicle to which the invention is applied.

What I claim as my invention and desire to secure by Letters Patent is:—

1. In mechanism for the control of a variable speed gear the combination of a selector member operative to change the gear ratio, a member adapted to engage the selector member so that it can impart movement thereto in one direction or the other, means for constantly reciprocating this member, a governor which is driven off the power transmitting shaft, and means by which fluctuations in the rotational speed of the governor are caused to bring about the engagement of the reciprocating member with or its disengagement from the selector member as set forth.

2. In mechanism for the control of a variable speed gear the combination of a selector member operative to change the gear ratio, two toothed racks with oppositely arranged teeth mounted on the selector member, pawls carried by a member which can be adjusted so as to bring these pawls respectively into engagement with one or the other of the toothed racks on the selector member when movement can be imparted to the latter in one direction or the other, means for constantly reciprocating the pawl carrying member, a governor which is driven off the power transmitting shaft, and means by which fluctuations in the rotational speed of the governor are caused to adjust the said member so as to bring the pawls carried thereby into engagement with or disengage them from the racks on the selector member as set forth.

3. In mechanism for the control of a variable speed gear the combination of a selector member operative to change the gear ratio, a member mounted so that it can slide longitudinally adjacent to the selector member and so that it can also move laterally, means whereby this member when moved laterally can engage the selector member so that it can then impart movement thereto in one direction or the other as the member moves longitudinally, means for reciprocating this member in the longitudinal direction, a governor which is driven off the power transmitting shaft, and means by which fluctuations in the rotational speed of the governor are caused to bring about the lateral movement of the reciprocating member and its engagement with or disengagement from the selector member as set forth.

4. In mechanism for the control of a variable speed gear the combination of a selector member comprising two parts one of which is acted on when a gear change is to be effected while the second part is directly operative to bring about the gear change, a yielding connection between these parts, a member adapted to engage the first part of the selector member so that it can impart movement thereto in one direction or the other, means for constantly reciprocating this member, a governor which is driven off the power transmitting shaft, and means by which fluctuations in the rotational speed of the governor are caused to bring about the engagement of the reciprocating member with or its disengagement from the selector member part as set forth.

5. In mechanism for the control of a variable speed gear the combination of a selector member operative to change the gear ratio, a member adapted to engage the selector member so that it can impart movement thereto in one direction or the other, means for reciprocating this member, a governor which is driven off the power transmitting shaft, means by which fluctuations in the rotational speed of the governor are caused to bring about the engagement of the reciprocating member with or its disengagement from the selector member, and means for simultaneously actuating a clutch operating lever when the reciprocating member is in engagement with and imparts movement to the selector member as set forth.

6. In mechanism for the control of a variable speed gear the combination of a selector member operative to change the gear ratio, a member adapted to engage the selector member so that it can impart movement thereto in one direction or the other, means for reciprocating this member, a governor which is driven off the power transmitting shaft, means by which fluctuations in the rotational speed of the governor are caused to bring about the engagement of the reciprocating member with or its disengagement from the selector member, and means for simultaneously actuating a throttle operating lever when the reciprocating member is in engagement with and imparts movement to the selector member as set forth.

7. In mechanism for the control of a variable speed gear the combination of a selector member operative to change the gear ratio, a member adapted to engage the selector member so that it can impart movement thereto in one direction or the other, means for constantly reciprocating this member, a governor which is driven off the power transmitting shaft, a member to which movement in one direction or the other is imparted by the governor as a result of fluctuations in the rotational speed of the governor, and means whereby the movement of this governor actuated member is caused to bring about the engagement of the reciprocating member with or its disengagement from the selector member as set forth.

8. In mechanism for the control of a variable speed gear the combination of a selector member operative to change the gear ratio, a member adapted to engage the selector member so that it can impart movement thereto in one direction or the other, means for constantly reciprocating this member, a governor which is driven off the power transmitting shaft, means by which fluctuations in the rotational speed of the governor are caused to bring about the engagement of the reciprocating member with or its disengagement from the selector member, and means for holding the selector member in the position in which it is set and for temporarily releasing it when it is moved by the reciprocating member so as to effect a change in the gear ratio as set forth.

9. In mechanism for the control of a variable speed gear the combination of a selector member operative to change the gear ratio, two toothed racks with oppositely arranged teeth mounted on the selector member, pawls carried by a member which can be adjusted so as to bring these pawls respectively into engagement with one or the other of the toothed racks on the selector member when movement can be imparted to the latter in one direction or the other, means for constantly reciprocating the pawl carrying member, a governor which is driven off the power transmitting shaft, and means by which fluctuations in the rotational speed of the governor are caused to adjust the said member so as to bring the pawls carried thereby into engagement with or disengage them from the racks on the selector member as set forth.

10. In mechanism for the control of a variable speed gear the combination of a selector member operative to change the gear ratio, a member mounted so that it can slide longitudinally adjacent to the selector member and so that it can also move laterally, means whereby this member when moved laterally can engage the selector member so that it can then impart movement thereto in one direction or the other as the member moves longitudinally, means for constantly reciprocating this member in the longitudinal direction, a governor which is driven off the power transmitting shaft, and means by which fluctuations in the rotational speed of the governor are caused to bring about the lateral movement of the reciprocating member and its engagement with or disengagement from the selector member as set forth.

11. In mechanism for the control of a variable speed gear the combination of a selector member comprising two parts one of which is acted on when a gear change is to be effected while the second part is directly operative to bring about the gear change, a yielding connection between these parts, a member adapted to engage the first part of the selector member so that it can impart movement thereto in one direction or the other, means for constantly reciprocating this member, a governor which is driven off the power transmitting shaft, and means by which fluctuations in the rotational speed of the governor are caused to bring about the engagement of the reciprocating member with or its disengagement from the selector member part as set forth.

12. In mechanism for the control of a variable speed gear the combination of a selector member operative to change the gear ratio, a member adapted to engage the selector member so that it can impart movement thereto in one direction or the other, means for constantly reciprocating this member, a governor which is driven off the power transmitting shaft, means by which fluctuations in the rotational speed of the governor are caused to bring about the engagement of the reciprocating member with or its disengagement from the selector member, and means for holding the selector member in the position in which it is set and for temporarily releasing it when it is moved by the reciprocating member so as to effect a change in the gear ratio as set forth.

13. In mechanism for the control of a variable speed gear the combination of a selector member operative to change the gear ratio, a member adapted to engage the selector member so that it can impart movement thereto in one direction or the other, means for constantly reciprocating this member, a governor which is driven off the power transmitting shaft, means by which fluctuations in the rotational speed of the governor are caused to bring about the engagement of the reciprocating member with or its disengagement from the selector member, and means for holding the reciprocating member so that the governor is inoperative to bring about the engagement of this member with the selector member as set forth.

14. In mechanism for the control of a variable speed gear the combination of a selector member operative to change the gear ratio, two toothed racks with oppositely arranged teeth mounted on the selector member, pawls carried by a member mounted so that it can slide longitudinally adjacent to the selector member and can also move laterally so as to bring the pawls respectively into engagement with one or other of the toothed racks on the selector member when movement can be imparted to the latter in one direction or the other as the pawl carrying member moves longitudinally, means for reciprocating the pawl carrying member in the longitudinal direction, a governor which is driven off the power transmitting shaft, and means by which fluctuations in the rotational speed of the governor are caused to bring about the lateral movement of the reciprocating member and effect the engagement of the pawls carried thereby with or their disengagement from the racks on the selector member as set forth.

15. In mechanism for the control of a variable speed gear the combination of a selector member comprising two parts one of which is acted on when a gear change is to be effected while the second part is directly operative to bring about the gear change, a yielding connection between these parts, two toothed racks with oppositely arranged teeth mounted on the first part of the selector member, pawls carried by a member which can be adjusted so as to bring these pawls respectively into engagement with one or other of the toothed racks on the selector member when movement can be imparted to the latter in one direction or the other, means for constantly reciprocating the pawl carrying member, a governor which is driven off the power transmitting shaft, and means by which fluctuations in the rotational speed of the governor are caused to adjust the said member so as to bring the pawls carried thereby into engagement with or disengage them from the racks on the first part of the selector member as set forth.

16. In mechanism for the control of a variable speed gear the combination of a selector member comprising two parts one of which is acted on when a gear change is to be effected while the second part is directly operative to bring about the gear change, a yielding connection between these parts, a member mounted so that it can slide longitudinally adjacent to the first part of the selector member and so that it can also move laterally, means whereby this member when moved laterally can engage the selector member part so that it can then impart movement thereto in one direction or the other as the member moves longitudinally, means for reciprocating this member in the longitudinal direction, a governor which is driven off the power transmitting shaft, and means by which fluctuations in the rotational speed of the governor are caused to bring about the lateral movement of the reciprocating member and its engagement with or disengagement from the first part of the selector member as set forth.

17. In mechanism for the control of a variable speed gear the combination of a selector member comprising two parts one of which is acted on when a gear change is to be effected while the second part is directly operative to bring about the gear change, a yielding connection between these parts, two toothed racks with oppositely arranged teeth mounted on the first part of the selector member, pawls carried by a member mounted so that it can slide longitudinally adjacent to the selector member and can also move laterally so as to bring the pawls respectively into engagement with one or other of the toothed racks on the selector member when movement can be imparted to the latter in one direction or the other as the pawl carrying member moves longitudinally, means for reciprocating the pawl carrying member in the longitudinal direction, a governor which is driven off the power transmitting shaft, and means by which fluctuations in the rotational speed of the governor are caused to bring about the lateral movement of the reciprocating member and effect the engagement of the pawls carried thereby with or their disengagement from the racks on the selector member as set forth.

18. In mechanism for the control of a variable speed gear the combination of a selector member comprising two parts one of which is acted on when a gear change is to be effected while the second part is directly operative to bring about the gear change, a yielding connection between these parts, a member adapted to engage the first part of the selector member so that it can impart movement thereto in one direction or the other, means for constantly reciprocating this member, a governor which is driven off the power transmitting shaft, means by which fluctuations in the rotational speed of the governor are caused to bring about the engagement of the reciprocating member with or its disengagement from the selector member part, and means for holding the selector member in the position in which it is set and for temporarily releasing it when it is moved by the reciprocating member so as to effect a change in the gear ratio as set forth.

19. In mechanism for the control of a variable speed gear the combination of a selector member operative to change the gear ratio, a member adapted to engage the selector member so that it can impart movement thereto in one direction or the other, means for reciprocating this member, a governor which is driven off the power transmitting shaft, means by which fluctuation in the rotational speed of the governor are caused to bring about the engagement of the reciprocating member with or its disengagement from the selector member, means for simultaneously actuating a clutch operating lever and also a throttle operating lever when the reciprocating member is in engagement with and imparts movement to the selector member as set forth.

20. In mechanism for the control of a variable speed gear the combination of a selector member operative to change the gear ratio, two toothed racks with oppositely arranged teeth mounted on the selector member, pawls carried by a member mounted so that it can slide longitudinally adjacent to the selector member and can also move laterally so as to bring the pawls respectively into engagement with one or other of the toothed racks on the selector member when movement can be imparted to the latter in one direction or the other as the pawl carrying member moves longitudinally, means for reciprocating the pawl carrying member in the longitudinal direction, a governor which is driven off the power transmitting shaft, means by which fluctuations in the rotational speed of the governor are caused to bring about the lateral movement of the reciprocating member and effect the engagement of the pawls carried thereby with or their disengagement from the racks on the selector member, and means for simultaneously actuating a clutch operating lever and also a throttle actuating lever when the pawls carried by the reciprocating member are in engagement with either of the racks on the selector member as set forth.

21. In mechanism for the control of a variable speed gear the combination of a selector member operative to change the gear ratio, a member adapted to engage the selector member so that it can impart movement thereto in one direction or the other, means for constantly reciprocating this member, a governor which is driven off the power transmitting shaft, means by which fluctuations in the rotational speed of the governor are caused to bring about the engagement of the reciprocating member with or its disengagement from the selector member, and means for holding the reciprocating member so that the governor is inoperative to bring about the engagement of this member with the selector member and also for positively bringing the reciprocating member into engagement with the selector member irrespective of the governor action as set forth.

22. In mechanism for the control of a variable speed gear the combination of a selector member comprising two parts one of which is acted on when the gear change is to be effected while the second part is directly operative to bring about the gear change, a yielding connection between these parts, two toothed racks with oppositely arranged teeth mounted on the first part of the selector member, a member mounted so as to slide adjacent to the first part of the selector member and having oppositely arranged teeth thereon, connections between this member and a clutch operating lever and a throttle operating lever such that sliding movement of this member in either direction will tend to actuate these levers, pawls carried by a member mounted so that it can slide longitudinally adjacent to the selector member and the clutch and throttle actuating member and can also move laterally so as to bring the pawls respectively into engagement with one or other of the toothed racks on the selector member and with one or other of the teeth on the clutch and throttle actuating member when movement can be imparted to both these members in one direction or the other as the pawl carrying member moves longitudinally, means actuated by the transmission shaft for constantly reciprocating the pawl carrying member in the longitudinal direction, a governor which is driven off the power transmission shaft having members movable by centrifugal force against the action of a spring, means for varying the action of the spring on the centrifugal members, and means by which the centrifugal movement of the governor members consequent on the fluctuations in the rotational speed of the governor are caused to bring about the lateral movement of the reciprocating member and effect the engagement of the pawls carried thereby with or their disengagement from the racks on the selector member and the teeth on the clutch and throttle actuating member as set forth.

In testimony whereof I have signed my name to this specification.

FRED ALBERT ODDIE.

Witnesses:
ERNEST H. ROBERTS.
I. C. GILES.